United States Patent [19]

Wojciechowski

[11] Patent Number: 4,713,546
[45] Date of Patent: Dec. 15, 1987

[54] HIGH PRESSURE SEAL

[75] Inventor: Charles R. Wojciechowski, West Chester, Ohio

[73] Assignee: General Electric Company, Cincinnati, Ohio

[21] Appl. No.: 684,000

[22] Filed: Dec. 20, 1984

[51] Int. Cl.⁴ .............................................. G01T 1/18
[52] U.S. Cl. ................................... 250/374; 250/385; 220/3
[58] Field of Search .................... 220/3, 378; 250/385, 250/374; 339/117 P

[56] References Cited

U.S. PATENT DOCUMENTS 3,244,106  4/1966  Guy ........................................ 220/3
3,616,958  11/1971 Mitchell ................................. 220/3
4,394,578  7/1983  Houston et al. ..................... 250/374
4,505,115  3/1985  Arbuckle .............................. 60/562
4,570,071  2/1986  Sippel et al. ........................ 250/385

Primary Examiner—Carolyn E. Fields
Attorney, Agent, or Firm—Derek P. Lawrence

[57] ABSTRACT

A substrate penetrates a main seal in an ionization chamber filled with pressurized gas. In one form of the present invention, a second chamber is provided around the region of penetration. The substrate then also penetrates the second chamber. The second chamber is pressurized with a gas at a lower pressure than in the ionization chamber. Thus, the pressure differential across the main seal is lowered, thereby reducing the load on the main seal.

11 Claims, 4 Drawing Figures

HIGH PRESSURE SEAL

The present invention relates to seals in pressure vessels and, more specifically, to seals in pressure vessels containing an ionizable medium.

BACKGROUND OF THE INVENTION

FIG. 1 illustrates an ionization detector. One such detector is that described in U.S. Pat. No. 4,129,783, to Housten, et al., which is hereby incorporated by reference. As shown in FIG. 2, radiation 3 is collimated by a collimating slit 6 and enters an ionizing chamber 9 contained in a housing 10. (The collimating slit is not shown in FIG. 1.) The chamber 9 contains an ionizable medium such as Xenon gas at a pressure of, for example, 1000 psi. A steel gasket 12 assists in sealing the two parts 15 and 18 of the housing 10. Parts 15 and 18 are held together by bolts (not shown). A substrate 19 enters the chamber 9 through a slot 20 (in FIG. 1) containing a seal 28. The substrate supports a plurality of conductors 24.

When the radiation 3 ionizes the medium, such as at point 21 in FIG. 2, an electron becomes separated from a Xenon atom, and the electron is captured by one of the conductors 24 in FIG. 1, thereby depositing a charge on the conductor. The spatial charge distribution on the conductors is thus a function of the spatial intensity distribution of the incoming radiation 3, and thus can be used to infer the material density distribution of an object through which the radiation passes en route to the ionization chamber 9. Thus, the substrate-conductor system can be considered as a sensor. Viewed another way, the conductors 24 in FIG. 1 serve a function analogous to X-ray film.

An unexpected phenomenon has been found in the seal 28 which seals the substrate 19 in FIGS. 1 and 2 to the housing 10. For example, when the chamber 9 is inflated to 1000 psi, the housing part 18 tends to deform or bow into the position shown (in grossly exaggerated form) by dashed line 30 in FIG. 2, as well as perhaps to deform in other, more complicated ways. Further, repeated pressurization and depressurization causes cyclic loading upon the seal 28 which is believed to also cause seal deformation. Some such seals 28 have been found by Applicant to fail, perhaps from deformation.

SUMMARY OF THE INVENTION

A substrate penetrates a main seal in an ionization chamber filled with pressurized gas. In one form of the present invention, a second chamber is provided around the region of penetration. the substrate then also penetrates the second chamber. The second chamber is pressurized with a gas at a lower pressure than in the ionization chamber. Thus, the pressure differential across the main seal is lowered, thereby reducing the load on the main seal.

DETAILED DESCRIPTION OF THE INVENTION

Figure 1:
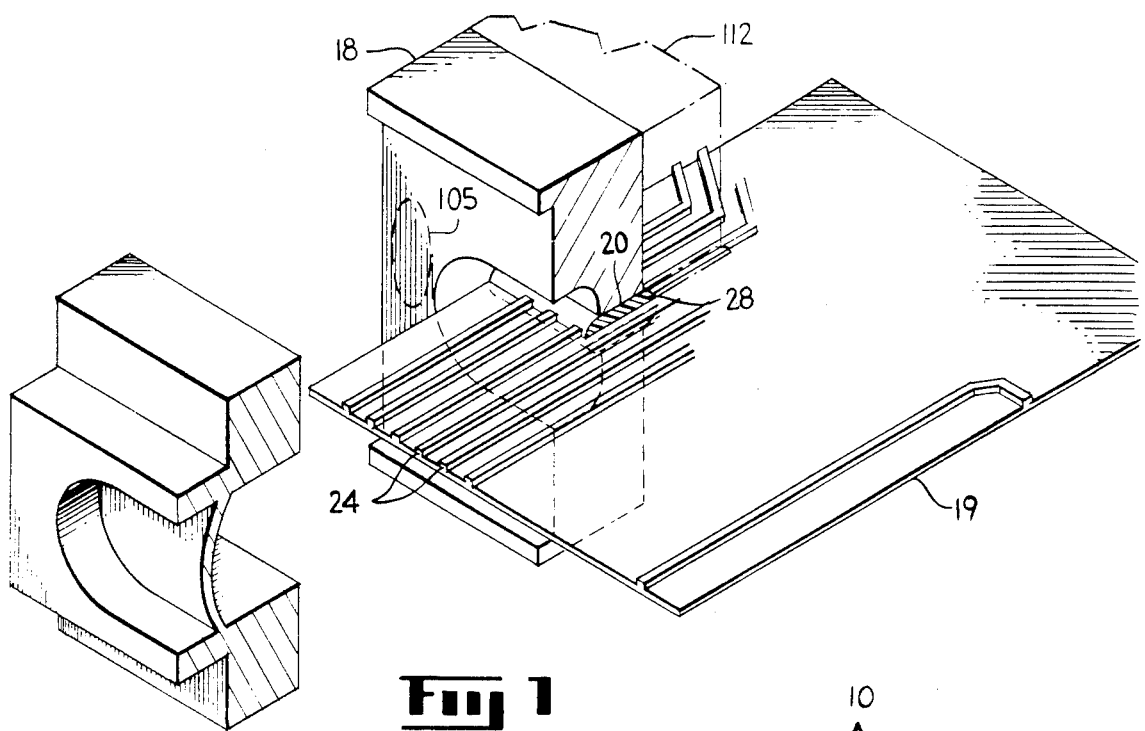
FIG. 1 illustrates an ionization detector in exploded view.
Figure 2:
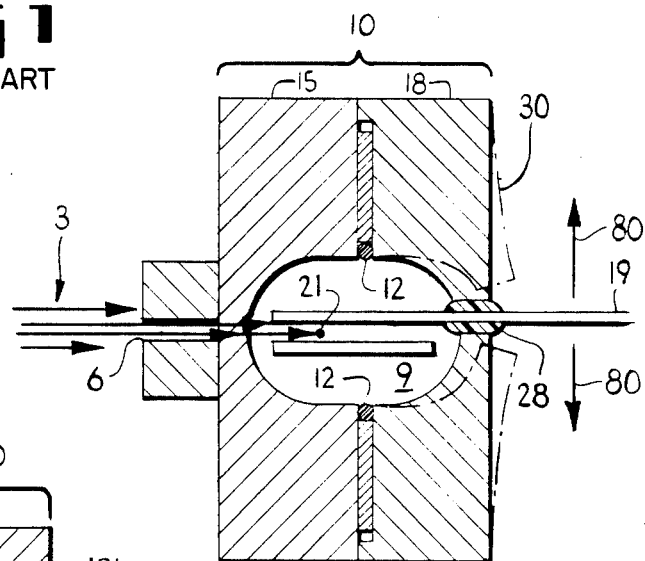
FIG. 2 illustrates a side view of an ionization detector of the type shown in FIG. 1.
Figure 3:
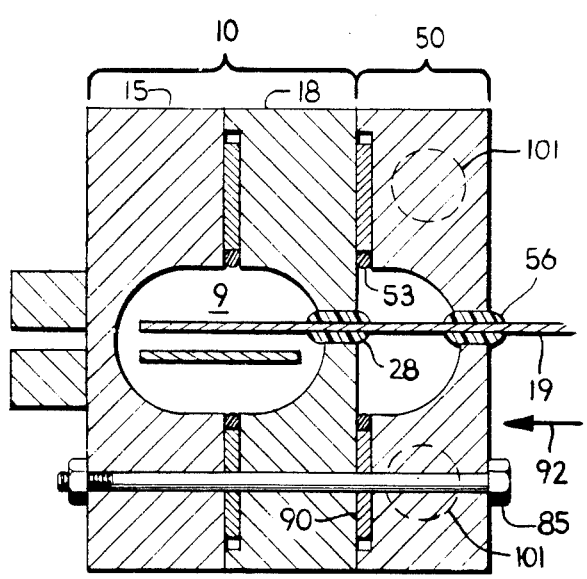
FIG. 3 illustrates one form of the present invention.

As shown in FIG. 3, a second housing 50 abuts housing 10 and is sealed thereto by a steel gasket 53. The second housing 50 can be identical in shape to part 18, as shown in FIG. 2. A second seal 56, preferably identical in composition to the first seal 28 in FIGS. 1 and 2, seals the substrate 19 to the second housing 50. Thus, if the pressure in chamber 9 is 1000 psi absolute (psia), if the pressure in the auxiliary chamber is 500 psia, and if the pressure external to the housings 10 and 50 is atmospheric pressure of about 14.7 psia, then the pressure differential across the first seal 28 and the second seal 56 are approximately equal at 500 psi. This is about one-half the pressure of the pressure difference across seal 28 in FIG. 2 when the ionization chamber 9 in that Figure is at 1000 psia. Further details of the construction of the type of ionization detector shown in FIG. 1 are found in the patent application filed by Douglas S. Steele, et al., Ser. No. 565,671, filed on Dec. 27, 1983, now U.S. Pat. No. 4,570,071, which is hereby incorporated by reference.

Figure 4:
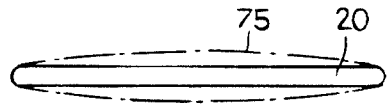
FIG. 4 is a view of the slot 20 in FIG. 1.

The Applicant points out that the bowing deformation indicated by dashed line 30 in FIG. 2 is only one of the types of deformation experienced by housing part 18. Another type is shown in FIG. 4 wherein the slot 20 in FIG. 1 is shown expanding or "yawning" into phantom shape 75. This yawning can result from the separation of the slot walls in the directions of arrows 80 in FIG. 2. Of course, as stated above, the actual deformation is probably a combination of these two types (i.e., bowing and yawning) as well as others.

The present invention, in addition to reducing the pressure load on seal 28 in FIG. 3, also reduces bowing and yawning, as will now be explained. Clamping by bolts such as bolt 85 in FIG. 3 causes the interface 90 to behave somewhat as a solid bond between housing 50 and part 18. Thus, bowing into phantom shape 30 in FIG. 2 is reduced by the inward force (in the direction of arrow 92 in FIG. 3) of the housing 50, as induced by bolt 85. Further, the tendency to yawn (i.e., open in the direction of arrows 80 in FIG. 2) is reduced because the material in regions 101 in FIG. 3 behave as the web of a girder which resists deformation, the webs being held together by the material in housing 50 which corresponds to the material in the region 105 in FIG. 1.

Applicant points out that the need for the present invention could be eleminated by merely lengthening housing part 18 as shown in phantom lines 112 in FIG. 1. However, signal transmission considerations and other factors require that the area of contact between the seal 28 and the substrate-conductor system be minimized. Thus, it is not desirable to undertake the phantom construction of FIG. 1.

An invention has been described for reducing the loading on a main seal which seals a slot or opening in the wall of a pressure vessel. A sensor (or, in more generalized terms, an element) passes through the slot. The present invention provides a means for applying a fluid pressure to the main seal, but external to the chamber, in order to reduce the pressure differential across the main seal.

Applicant points out that the seal 28 in his Figures is stationary. That is, is not designed to move with respect to the housing part 18. This is in contrast with a seal taking the form of a piston ring, which also faces a pressure differential across it, but moves.

Numerous modifications and substitutions can be undertaken with respect to the preferred embodiment herein described without departing from the fundamental concept and scope of the present invention.

What is desired to be secured by Letters Patent of the United States is the invention as defined in the following claims.

I claim:

1. A pressure vessel, comprising a first housing having first and second portions and surrounding a first chamber containing a fluid at a first pressure; a component penetrating the first housing through an opening in the first portion of the first housing, said component being sealed to the first housing to inhibit leakage of fluid from said first chamber; a second housing attached to said first housing about said opening to reduce deformation of the first portion of the first housing; and a second chamber enclosed by said second housing and said first portion of said first housing and containing a fluid at a second pressure.

2. The pressure vessel of claim 1, wherein said second housing and a second portion of said first housing are subject to a third pressure, said third pressure being less than said second pressure, and said second pressure being less than said first pressure.

3. The pressure vessel of claim 1, wherein said second housing is bolted to said first housing.

4. The pressure vessel of claim 1, wherein said first housing comprises two generally rectangular parts, each part having a cavity; said first chamber is defined by the cavities when said parts are joined; said second housing is generally rectangular and has a cavity; and said second chamber is defined by the cavity of said second housing and said first portion of said first housing when said second housing is attached to said first housing.

5. The pressure vessel of claim 1, wherein said first portion has a first predetermined thickness and said second portion has a second predetermined thickness, wherein said first predetermined thickness is less than said second predetermined thickness.

6. An ionization detector, comprising a first housing having first and second portions and surrounding a first chamber containing a fluid at a first pressure; a substrate which supports a plurality of conductive strips, penetrates the first housing through an opening in the first portion of the first housing, and enters the first chamber, said substrate being sealed to the first housing to inhibit leakage of fluid from said first chamber; a second housing attached to said first housing about said opening to reduce deformation of the first portion of the first housing; and a second chamber enclosed by said second housing and said first portion of said first housing and containing a fluid at a second pressure.

7. The ionization detector of claim 6, wherein said second housing and a second portion of said first housing are subject to a third pressure, said third pressure being less than said second pressure, and said second pressure being less than said first pressure.

8. The ionization detector of claim 6, wherein said second housing is bolted to said first housing.

9. The ionization detector of claim 6, wherein said first housing comprises two generally rectangular parts, each part having a cavity; said first chamber is defined by the cavities when said parts are joined; said second housing is generally rectangular and has a cavity; and said second chamber is defined by the cavity of said second housing and said first portion of said first housing when said second housing is attached to said first housing.

10. The pressure vessel of claim 6, wherein said first portion has a first predetermined thickness and said second portion has a second predetermined thickness, wherein said first predetermined thickness is less than said second predetermined thickness.

11. A pressure vessel, comprising a first housing having first and second portions and surrounding a first chamber containing fluid at a first pressure; said first portion having a first predetermined thickness and said second portion having a second predetermined thickness, wherein said first predetermined thickness is less than said second predetermined thickness; a component penetrating the first housing through an opening in the first portion of the first housing, said component being sealed to the first housing to inhibit leakage of fluid from said first chamber; a second housing attached to said first housing about said opening; and a second chamber enclosed by said second housing and said first portion of said first housing and containing a fluid at a second pressure.

* * * * *